3,068,221
SEPARATION OF NOVOBIOCIN
Gordon H. French, Kalamazoo, Mich., assignor to The Upjohn Company, Kalamazoo, Mich., a corporation of Delaware
No Drawing. Filed Mar. 18, 1960, Ser. No. 15,819
6 Claims. (Cl. 260—210)

This invention relates to a process, and is particularly concerned with the recovery of novobiocin. More particularly, this invention relates to a process for the selective separation of novobiocin from associated acid-precipitable impurities by crystallizing the novobiocin from an aqueous solution of acetone containing from about 5% to about 45% acetone at a pH between about 4 and 6.5.

Novobiocin, 7 - [4 - (carbamoyloxy)tetrahydro - 3 - hydroxy - 5 - methoxy - 6,6 - dimethylpyran - 2 - yloxy] - 4-hydroxy - 3 - [4 - hydroxy - 3 - (3 - methyl - 2 - butenyl)-benzamido]-8-methylcoumarin, is an antibiotic which has the following structural formula:

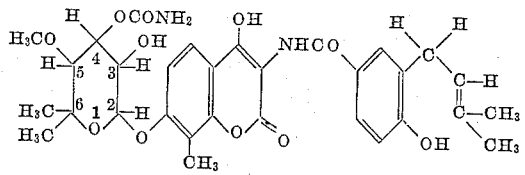

and an optical rotation $[\alpha]_D^{23-28°}$ equals minus 63.0° (c., one percent absolute ethanol, two decimeters). It is obtained by cultivating, under controlled conditions, and on suitable nutrient culture media, *Streptomyces niveus*, NRRL 2466. It can also be produced by other actinomycetes, for example, *Streptomyces spheroides* NRRL 2449, *Streptomyces spirogriseus* NRRL 2590, and *Streptomyces griseus* ATCC 12,318. The process of the invention is not limited by the aforementioned actinomycetes but relates broadly to the separation of the antibiotic from an admixture with associated acid-precipitable impurities however the antibiotic is formed.

Novobiocin has been recovered by precipitation from an aqueous solution by adjusting the pH to about 2. However, when the process is applied to aqueous solutions containing novobiocin and other metabolic products of the process of its production, such other products precipitate along with the novobiocin. These other metabolic products include descarbamyl novobiocin, isonovobiocin, water insoluble fatty acid materials, and in general all acid precipitable materials in the fermentation broth or beer. This invention is directed to improvements in this type of process wherein a selective crystallization of novobiocin is obtained. Thus by the processes of this invention one is enabled to crystallize novobiocin while leaving in solution the aforementioned acid-precipitable impurities.

In carrying out the process of the invention the crude novobiocin containing associated acid-precipitable impurities, is crystallized from an aqueous solution of acetone, containing from about 5% to about 45% acetone, while maintaining a pH between about 4 and 6.5. By effecting the crystallization from an aqueous solution of acetone, containing from about 5% to about 45% acetone, while acidifying, as required, to keep the pH between about 4 and 6.5 preferably between pH 6 and 6.3, a selective crystallization is obtained in which the associated acid-precipitable impurities are retained in the solution while the novobiocin is crystallized out and recovered.

In a preferred embodiment of the invention, acetone is incorporated in an aqueous alkaline solution containing novobiocin in admixture with associated acid-precipitable impurities to a concentration of from about 5% to about 45% acetone, and preferably between about pH 6 and 6.3. By thus effecting crystallization at a relatively high acid pH, that is, between about 4 and 6.5 in a 5% to 45% acetone solution, a selective crystallization is accomplished wherein the novobiocin is crystallized from the solution while most of the other acid-precipitable compounds remain in solution.

The desired pH, i.e., between about 4 and 6.5, is suitably maintained by continuous addition of acid. The acidification can be accomplished by using any acid strong enough to bring the pH to about 4 to 6.5, and to hold the pH within those given limits. It has been found in this instance that it is advantageous and desirable to use, at least at the start of the crystallization, the weak organic acid, citric acid. The use of strong acids, in the early stages of mixing the crystal formation, tends to cause biological inactivation of novobiocin. Also, with other acids, as the concentration of their salts builds up, the solution becomes non-homogeneous and separates into two phases. These disadvantages are minimized by the use of citric acid since both citric acid and its alkaline salts are soluble in aqueous acetone of the concentrations involved. Citric acid is of advantage also because of its buffering properties at a pH of between about 2.4 and 5.8. It is therefore easier to maintain the desired pH during the acidification and crystallization. It is to be understood however, that although citric acid is the acid of choice of this process, other weak organic acids, or other strong mineral acids can be used in the acidification.

It is a further embodiment of this invention to dissolve citric acid in dry acetone, and then to add an aqueous solution containing novobiocin and associated acid-precipitable impurities. The proportions are adjusted so that the resulting aqueous acetone solution will contain between about 5% and about 45% acetone in water. It is advantageous and desirable to use sufficient citric acid to neutralize about one-third of the alkaline sodium salt of novobiocin present to free acid novobiocin. For the remaining two-thirds of the neutralization process it is both advantageous and desirable to use a strong mineral acid such as sulfuric acid.

In a preferred embodiment of the invention, the novobiocin is produced by fermentation. The whole broth is brought to an alkaline pH of between about 8 and 9.5 and filtered. The filtrate is acidified to an acid pH between about 4 and 6.5, and preferably to about pH 6 to 6.3. Then the novobiocin in the filtrate is extracted with a water-immiscible organic solvent for novobiocin, for example, butyl acetate. The novobiocin is extracted from the solvent into an aqueous alkaline buffer solution of about pH 9 to about pH 11. The aqueous alkaline buffer solution containing novobiocin is introduced, with mixing, into a mixture of dry acetone and citric acid in such proportions that the final percentage of aqueous acetone solution will be from about 5% to about 45% and preferably from about 10% to about 25% acetone. Additional acid is added as necessary to keep the pH between about 4 and 6.5. Citric acid is used to the extent that it will neutralize about one-third of the alkaline novobiocin present. For neutralizing the remaining two-thirds of the alkaline novobiocin a strong mineral acid is added to the solution as required to keep the pH between about 4 and 6.5, and preferably between about pH 6 and 6.3. The crystals are recovered by filtration, washed with 60% aqueous acetone, and dried in vacuo.

The crystallization is advantageously effected at room temperature i.e., between about 20° and 25° C. although higher and lower temperatures may be used.

The invention can be more fully understood by reference to the following example which is given by way of illustration only and is not to be construed as limiting.

The parts throughout are by weight unless otherwise specified. In the case of the aqueous acetone solutions however, the percentages are by volume.

*Example 1*

Novobiocin was produced in a fermented broth according to the pending U.S. application, Serial No. 602,814, filed August 8, 1956.

To 11,600 gallons of fermented broth was added 100 pounds of sodium carbonate in 200 gallons of tap water to adjust to pH 9. The mixture was filtered using 3,800 pounds of diatomite, the pH of the clarified beer was adjusted to pH 6 by the addition of 72 gallons of 75% phosphoric acid, and the filtrate was polished on a plate and frame filter press to further clarify it. The polished beer was extracted with 2,400 gallons of butyl acetate in a Podbielniak extractor. The butyl acetate extract, containing the novobiocin, was extracted in a Podbielniak extractor with 470 gallons of pH 10.5 carbonate buffer, obtained by dissolving 187 pounds of anhydrous sodium carbonate and 16.3 pounds of sodium bicarbonate in 470 gallons of deionized water to make a 0.5 molar solution. The aqueous extract containing the novobiocin was run, with stirring, into a tank containing 90 gallons of acetone and 75 pounds of citric acid. When the mixture reached pH 6, addition of 60% sulfuric acid was started and then continued at a rate to hold the mixture between pH 6 and 6.3. The temperature, throughout the crystallization, was held at about 20° to about 25° C. The resultant crystals were filtered, washed with water, and filtered again. The crystalline material was slurried with 5 gallons of a 60% aqueous acetone solution and the crystals were filtered and dried in vacuo to yield 14.28 kilograms of crystalline novobiocin. The crystalline novobiocin was dissolved in 26 gallons of dry acetone by heating to about 50° to 60° C., filtered, and the cake was washed with one gallon of dry acetone. The acetone solutions were combined and 27 gallons of deionized water at 50° C. was added to the combined acetone solutions. The mixture was agitated vigorously and crystallization occurred. Cooling to 25° C. increased the crystal yield. The crystals were filtered, washed with about 0.5 gallon of 60% aqueous acetone, and vacuum dried to yield 12.8 kgs. of substantially pure novobiocin assaying 960 mcg./mg. by *Klebsiella pneumoniae* biological assay and melting between 176°–177° C.

I claim:

1. A process for the separation of novobiocin from associated acid-precipitable impurities which comprises crystallizing the novobiocin from an aqueous solution of acetone containing from about 5% to about 45% acetone while maintaining the pH between 4 and 6.5.

2. A process for the separation of novobiocin from associated acid-precipitable impurities which comprises acidifying an alkaline solution containing novobiocin and associated acid-precipitable impurities in an aqueous acetone solution containing from about 5% to about 45% acetone, at a rate to keep the pH between 4 and 6.5.

3. A process for the separation of novobiocin from associated acid-precipitable impurities which comprises acidifying an alkaline solution containing novobiocin and associated acid-precipitable impurities in aqueous acetone solution containing from about 5% to about 45% acetone at a rate to keep the pH between 4 and 6.5, at least about the first-third of the total acid used being citric acid.

4. A process for the separation of novobiocin from associated acid-precipitable impurities which comprises acidifying an alkaline solution containing novobiocin and associated acid-precipitable impurities in aqueous acetone solution containing from about 5% to about 45% acetone, said acidifying being effected at a rate to keep the pH between about 4 and 6.5 with about the first-third of the total acid used being citric acid and the balance sulfuric acid.

5. In a process for the separation of novobiocin from associated acid-precipitable impurities by crystallizing the novobiocin from an aqueous solution of acetone containing from about 5% to about 45% acetone by acidifying with citric acid and sulfuric acid as required to keep the pH between about 4 and 6.5, the improvement which comprises mixing citric acid and dry acetone, adding thereto an aqueous alkaline solution of the said novobiocin, and adding sulfuric acid when the pH reaches pH 6 and continuing the addition of sulfuric acid until completion of crystallization at a rate to keep the pH within the limit of between 4 and 6.5, the proportions and concentrations being selected so that the final solution contains from 5% to 45% acetone, and the temperature being held to between about 20° to 25° C.

6. A process for the separation of novobiocin from associated acid-precipitable impurities which comprises acidifying an alkaline solution containing novobiocin and associated acid-precipitable impurities in aqueous acetone solution containing from about 5% to about 45% acetone at a rate to keep the pH between 6 and 6.3, at least about the first-third of the total acid used being citric acid.

References Cited in the file of this patent

UNITED STATES PATENTS 2,931,796     De Vries _____ Apr. 5, 1960

FOREIGN PATENTS 212,939     Australia _____ Feb. 6, 1958